United States Patent [19]
Holmes et al.

[11] 3,889,258
[45] June 10, 1975

[54] NAVIGATION RANGING SYNCHRONIZATION

[75] Inventors: Jerry D. Holmes, Dallas; Samuel D. Moore, Plano, both of Tex.

[73] Assignee: Texas Instruments Incorporated, Dallas, Tex.

[22] Filed: Aug. 22, 1973

[21] Appl. No.: 390,633

[52] U.S. Cl. ............................. 343/6.5 LC; 343/15
[51] Int. Cl. ............................................. G01s 9/56
[58] Field of Search .............. 343/6.5 R, 6.5 LC, 15

[56] References Cited
UNITED STATES PATENTS

| | | | |
|---|---|---|---|
| 3,618,089 | 11/1971 | Moran | 343/15 X |
| 3,810,179 | 5/1974 | Merrick | 343/6.5 LC |

Primary Examiner—T. H. Tubbesing
Attorney, Agent, or Firm—Hal Levine; Leo N. Heiting; Rene' E. Grossman

[57] ABSTRACT

In radio ranging from a mobile station and a plurality of base stations, different pulse position codes are transmitted from the mobile station in sequence, one code for each base station. Identical reply pulse position codes are transmitted from each base station in response to receipt of one of the unique codes. In response to receipt of each reply code, a plurality of trains of listening intervals, one for each base station, are initiated each being dependent upon the time of receipt of a reply code from a base station. A train of uniformly time spaced ranging pulses is then transmitted after receipt of a reply pulse code from the base stations. The transporting of ranging pulses from each base station is enabled in a sequence between base stations responsive to successive ranging pulses in the train.

12 Claims, 13 Drawing Figures

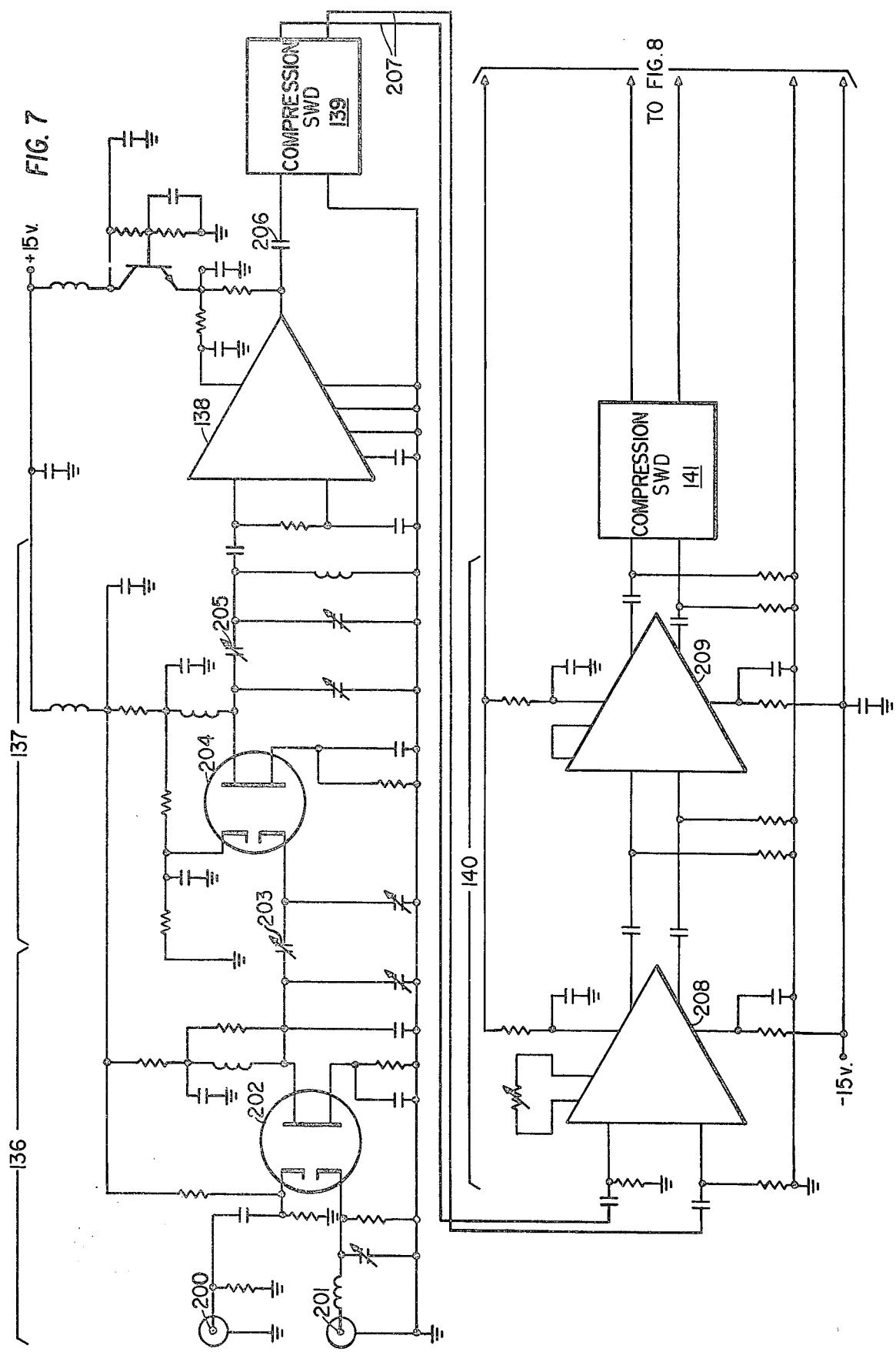

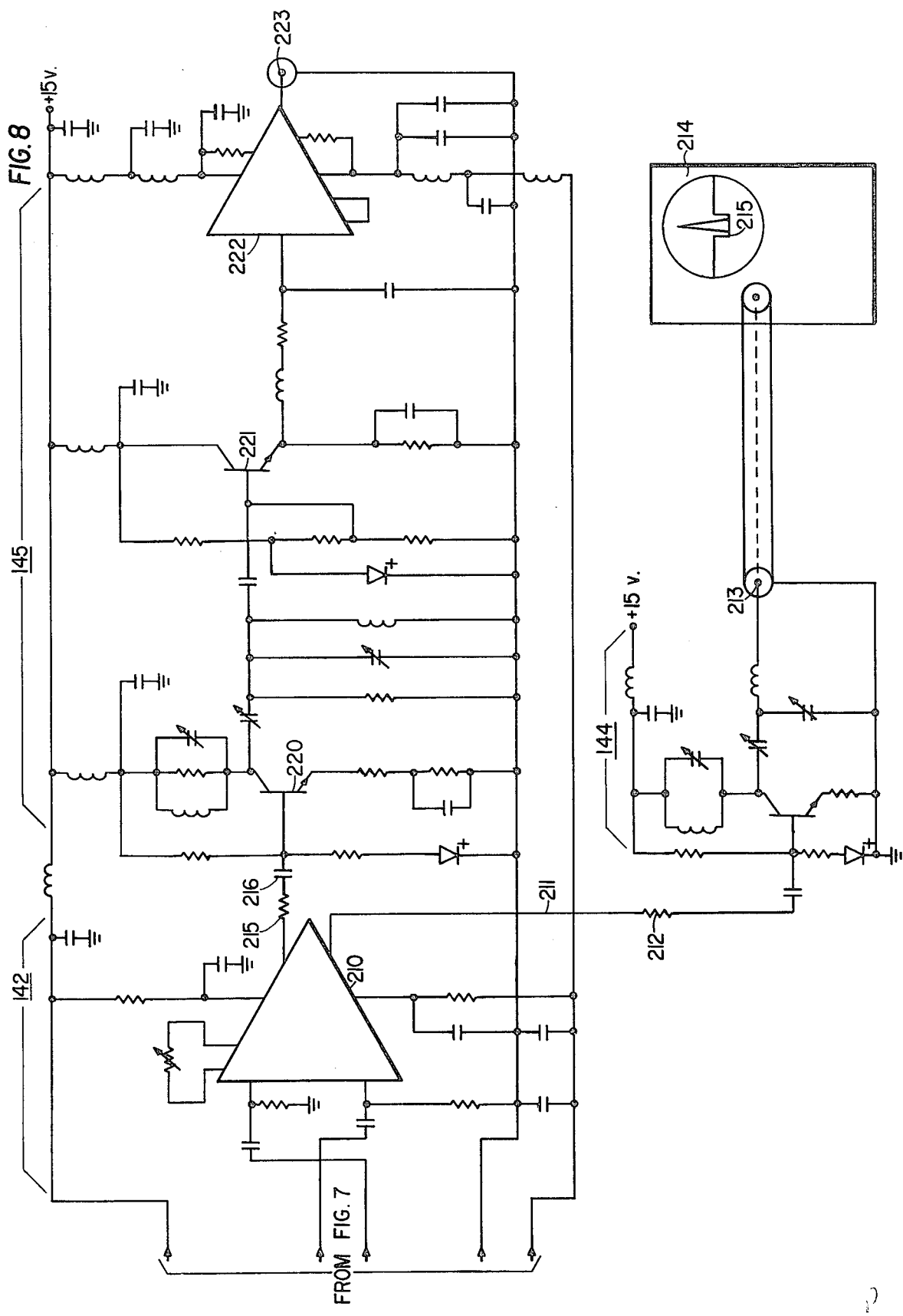

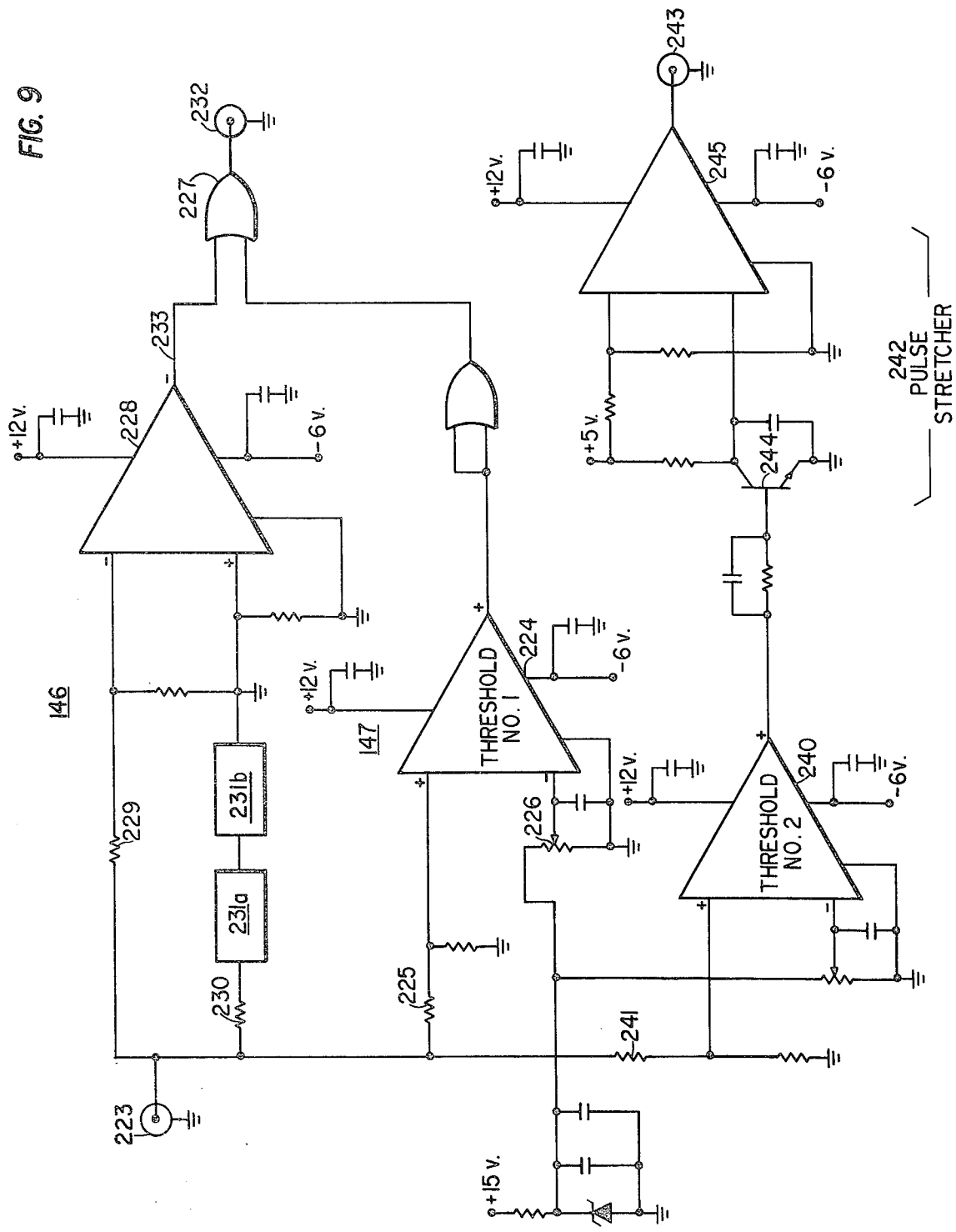

NAVIGATION RANGING SYNCHRONIZATION

This invention relates to synchronizing radio ranging units in marine navigation, and more particularly to establishing responsive sequences at a plurality of base stations from a mobile station with periodic sequence adjustment for change in position of the mobile station.

Offshore exploration for oil requires accurate continuously operating marine navigation. Pulsed range-range Shoran type systems operating at VHF/UHF frequencies have provided accurate and reliable navigation data in line of sight systems. Efforts have been made to extend reliable operations to 250 miles or more to require overcoming such problems as skywave interference and lane counting, both factors which generally limit usefulness of lower frequency systems now used at longer ranges.

In copending U.S. patent application Ser. No. 389,903, filed Aug. 20, 1973, a system is described and claimed which operates at VHF/UHF frequencies and is effective beyond the radio horizon with reasonable sized transponder systems.

In pulse transmission systems the signal-to-noise ratio in matched filter receivers increase directly with the amount of energy contained in the pulse. For rectangular shaped pulses, the energy in the pulse is the product of the RMS power level of the pulse times the pulse width. Pulse energy is increased by increasing the pulse amplitude or pulse duration or both.

Final amplifier stages typically are peak power limited. Upon reaching the power limit, the only way to achieve increase in pulse energy is to lengthen the pulse duration. However, for uncoded pulses, the bandwidth of the pulse signal is reduced directly as the pulse width increases. This is undesirable because range resolution, i.e., the ability to measure range accurately, is directly related to signal bandwidth. Accurate range measurement via pulse techniques requires relatively large bandwidths.

Thus, there are competing demands on uncoded pulse ranging system pulse parameters. Signal-to-noise ratio considerations mitigate in favor of long pulse widths in order to increase pulse energy. Range resolution considerations mitigate in favor of short pulse widths in order to increase the signal bandwidth.

Pulse compression methods such as the nonlinear FM signals utilized herein combines the best of both worlds. For example, the pulse width preferably is of about 30 microseconds as opposed to the Shoran pulse width of 0.8 microsecond. The same peak power limitation then produces $30/0.8 = 37.5$ times more energy in the transmitted pulse. This factor permits operation at ranges of 250 miles whereas prior systems only work up to 150 miles.

Even though the pulse has 30 microseconds duration, it is wide band, about 2.8 mHz which is approximately the same as prior art uncoded 0.8 microsecond pulses. Consequently, the inherent range resolving ability of the signal, determined by its bandwidth, is essentially the same as for prior systems. This being the case, the net gain is that due to the 37.5 times increase in pulse transmitted energy.

This advantage is achieved by use of matched filter receivers wherein the receiver is matched to the transmitted signal waveform by use of surface wave devices. The advantage of such devices is that complex waveforms can readily be generated in a transmitter and processed in a receiver.

The present invention is directed to an advanced extended range marine navigation system which utilizes surface-wave-device matched filters which enhance signal-to-noise ratios with special sync processing of an output signal. A system is provided which will operate at ranges over 250 miles versus approximately 150 miles maximum for known currently operable and available Shoran systems. The present invention facilitates such operations while using only one 2.8 megaHertz (maximum) bandwidth VHF/UHF channel. This is compared with the requirement of generally two to six megaHertz bandwidth channels for Shoran systems.

More particularly, a mobile station at a trans-horizon location relative to a plurality of base stations is to respond to transmission from the mobile station to the base stations and return. At the mobile station, a sequence of pulse position codes is transmitted periodically. Decoders unique to each base station are each tailored to respond to one of the codes in the sequence. In response to decoder output, each base station replies with a common pulse position code. Each pulse position code includes a key pulse which bears a predetermined relation to uniformly time spaced range control pulses. The base stations then respond sequentially to successive range pulses and receiver means at the mobile station responds sequentially to return range pulses from the base stations. Periodic shift from a range mode to a sync mode automatically adjusts the system for change in position of the mobile station.

For a more complete understanding of the present invention and for further objects and advantages thereof, reference may now be had to the following description taken in conjunction with the accompanying drawings in which:

FIG. 7 illustrates pulse compression portions of the receiver system of FIG. 3;

FIG. 8 is a detailed circuit diagram of the IF amplifier and envelope detector of the receiver portion of FIG. 3;

FIG. 9 illustrates pulse detection and synchronous processing portions of the receiver of FIG. 3;

Figure 1:
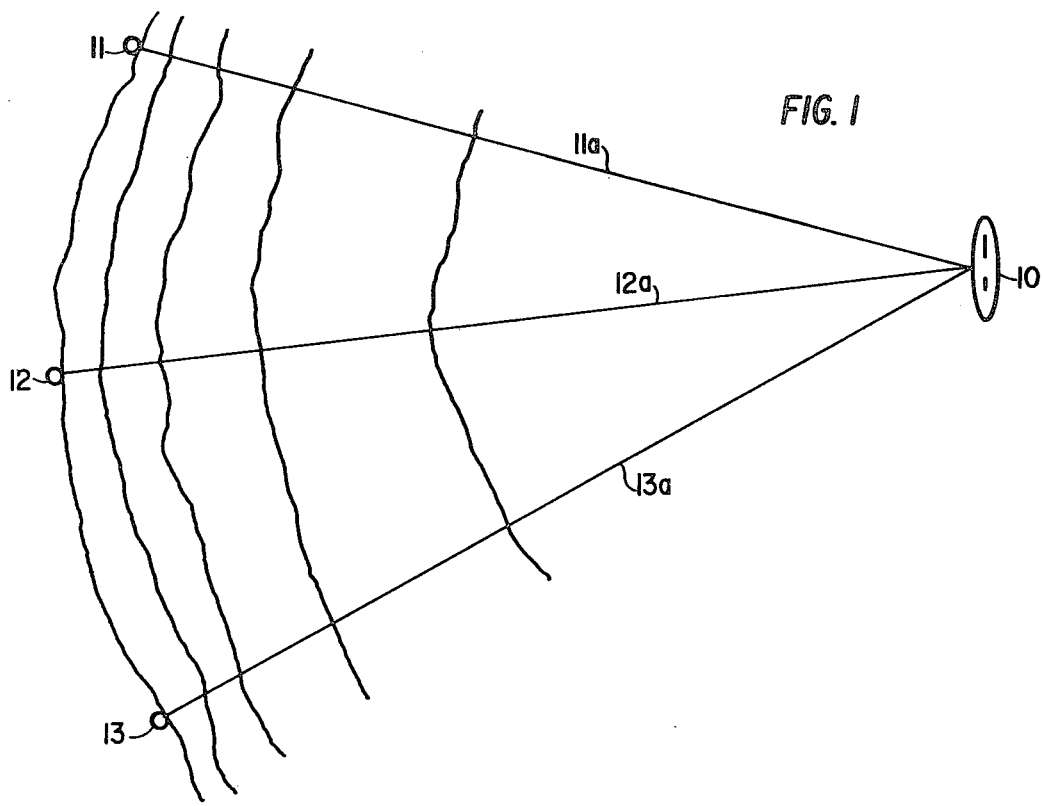
FIG. 1 is a plan view of a system embodying the present invention.

Referring now to FIG. 1, a ship 10 carries a mobile station comprising a transmitter and receiver. Ship 10 is to chart its course relative to accurately located base stations 11, 12 and 13. A transponder is located at each of the base stations 11–13. Operation of such units is generally referred to under the trade name Shoran. By the present invention, the operation is to be carried out even though ship 10 is beyond normal Shoran range, i.e., stations 11–13, with respect to ship 10, are below the horizon. Shoran type systems measure the time required by radio frequency waves to travel between each transmitter-receiver pair. With the velocity of propagation known, computation of the range along any one of paths 11a, 12a or 13a may be made. Signals are directed from a transmitter on ship 10 to a base station 11 which transponds signals back to the ship 10. In general such operations are well established and have long been in use.

The present invention extends the range beyond the capability of present day Shoran type systems. Surface-wave devices employed contribute to the increased range capability and increase the accuracy of the determination of the range from 15 meters down to 3 meters.

Figure 2:
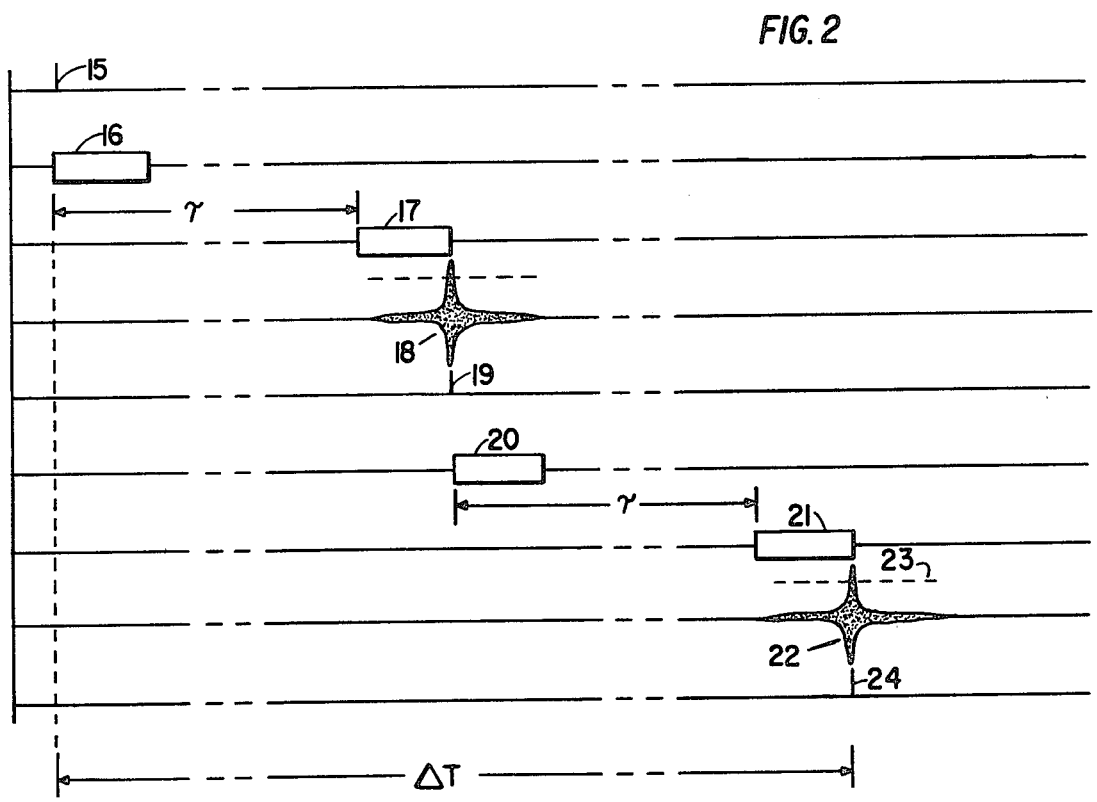
FIG. 2 illustrates time relationships involved in the present invention.

FIG. 2 illustrates on a time scale the sequence of operations involved in an embodiment of the invention employed as shown in FIG. 1. Mobile station 10 includes a transmitter in which there is produced a high frequency pulse 15, FIG. 2. Pulse 15 preferably is a fraction of a microsecond in length, typically 0.5 $\mu$ sec. This pulse is then applied to a surface-wave device to stretch the pulse and to form a frequency modulated pulse 16 of the order of 30 microseconds in length. Pulse 16 is then applied to a radio frequency transmitter having power output of the order of 20 kw. The resultant signal will be spread over a time interval as represented by the block 17 as it appears at a transponder station 11. The time of propagation from mobile station 10 to transponder station 11 is indicated in the FIGURE by the value. The received signal is applied to a surface-wave device which is a filter matched to the device which stretched pulse 15 to the length of block 16. The second surface-wave device compresses the pulse to a form generally represented by the waveform 18. This pulse is then applied to a threshold device and is specially processed to produce an output pulse 19. The output pulse 19 is then applied to a pulse generator at base station 11 to produce a fractional microsecond high frequency pulse which pulse is then applied to a third surface-wave device to stretch it to a 30 microsecond F.M. pulse 20. The latter pulse is then applied, after amplification, in a radio transmitter at transponder station 11 to an antenna for broadcast. As above, the propagation time from transponder station 11 to mobile station 10 is indicated in the FIGURE by the value $\lambda$. The pulse 21 received back at the mobile station 10 is then sensed and applied to a surface-wave device to compress it into a pulse 22. This pulse is then thresholded at a level such as level 23 to produce a final output pulse 24. By this procedure a time measurement $\Delta T$ is produced which, when corrected for the pulse stretching process, determines the transit time over the path 11a. The same procedure is then followed relative to station 12 to determine the time required for transit over path 12a. Path 13a is thereafter evaluated, following which the cycle is then repeated.

Figure 3:
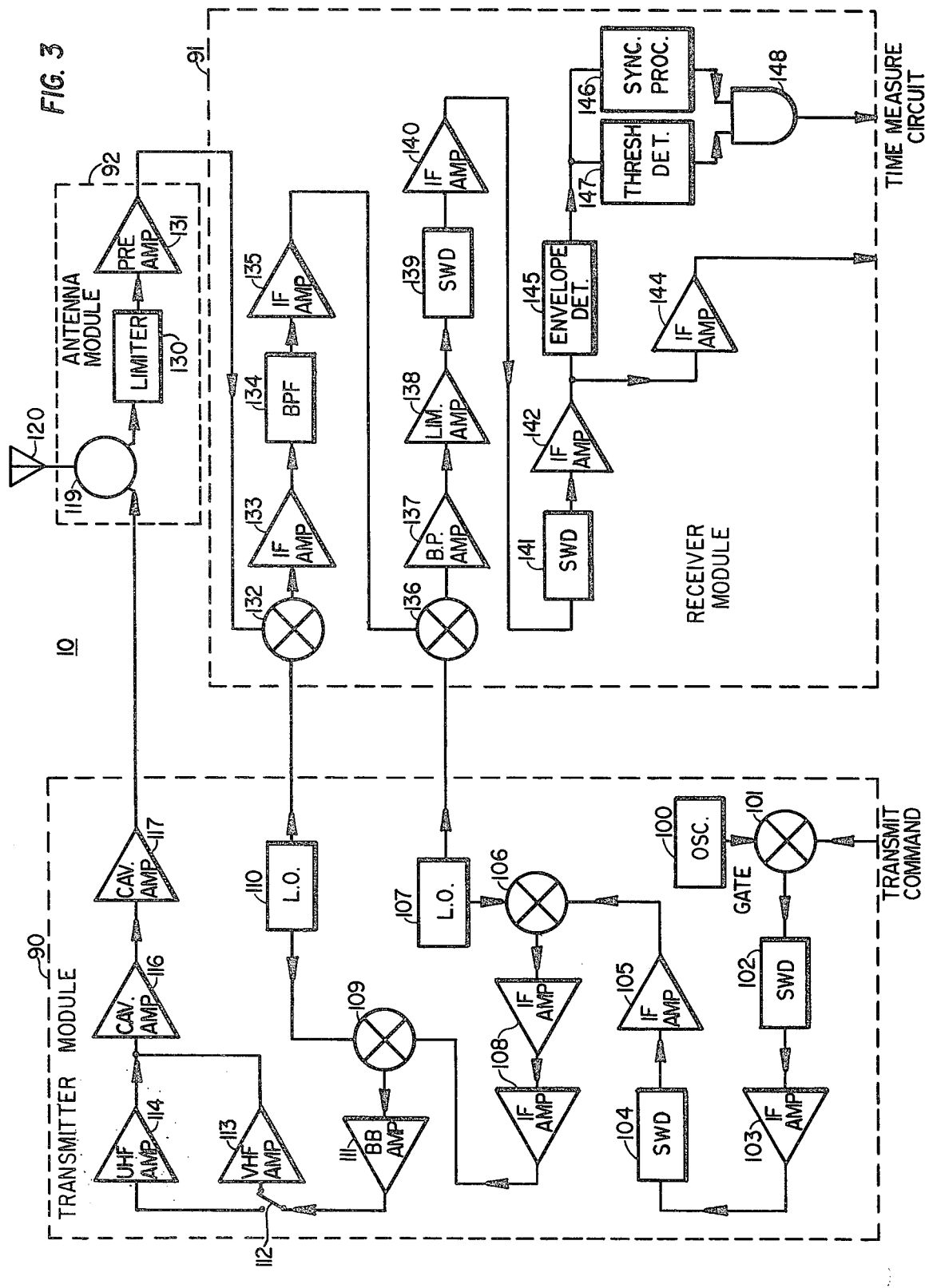
FIG. 3 is a block diagram of the system embodying the present invention.

An embodiment of the system for carrying out the foregoing operations is illustrated in FIG. 3.

In FIG. 3 the mobile station 10 is shown as comprising a transmitter module 90 and a receiver module 91 interconnected by an antenna module 92.

FIG. 3 — TRANSMITTER

In this embodiment, an oscillator 100 operates at 23.5 mHz to feed a gate 101 whose output is then applied to a surface-wave unit 102. Gate 101 is actuated to pass a high frequency fractional microsecond pulse (about 0.5 $\mu$ second). Unit 102 frequency modulates the pulse while expanding its length to 15 microseconds. Unit 102 introduces a loss in signal level. Amplifier 103 has the gain necessary to restore the signal level. The output of amplifier 103 is applied to a second surface-wave device 104 which further expands the pulse length to 30 microseconds but with attenuation. Amplifier 105 restores the loss of the signal level experienced in device 104. The output of amplifier 105 is a 30 microsecond pulse at a frequency which varies in accordance with the pattern mechanically set in the surface-wave devices 102 and 104. Preferably the frequency variation is in the form of a chirp. The geometry of the surface wave device 102, 104 controls the variation in frequency as a function of time and at the same time spreads the pulse over a substantial time interval. The power level for the duration of pulse 16 is constant.

The output of amplifier 105 is then applied to a mixer 106. A 113.5 mHz local oscillator 107 feeds the mixer 106 so that the output as applied to amplifier 108 will be at a frequency centered at 90 mHz. Amplifier 108 is provided to make up for the loss in mixer 107 and provide some additional gain. The output of amplifier 108 is then applied to mixer 109. The mixer 109 is driven from a second local oscillator 110 at a selected frequency in the range preferably of from 290 to 540 mHz. The frequency selected for the oscillator 110 is dictated by the frequency of the desired ultimate transmission.

The output of mixer 109 is then applied to amplifier 111 which restores the loss involved in mixer 109. The output of amplifier 111 is then applied by way of switch 112 to either of two amplifiers 113 and 114. Two amplifiers are provided to accommodate 200–450 mHz frequency range. The selected amplifier output is fed to a pair of series amplifiers 116 and 117. The output of amplifier 117 is then applied by way of a circulator 119 to an antenna 120.

The input to amplifier 116 may be of the order of 80 watts. Amplifier 116 may have a power gain of 11 db to raise the output power level to 1 kw. Amplifier 117 may have a power gain of 13 db to raise the output power level to 20 kw. Amplifiers 116 and 117 typically are vacuum tube cavity toned amplifiers.

FIG. 3 — RECEIVER

The receiver channel extends from antenna 120 by way of a limiter 130 and a preamplifier 131 to a mixer which is also fed from local oscillator 110. The output of mixer 132 is connected to a channel including amplifier 133, band-pass filter 134, amplifier 135, and a second mixer 136 which is fed by local oscillator 107. The output of mixer 136 is then amplified by a band-pass amplifier 137 and a limiting amplifier 138 connected to a surface-wave device 139. The output of device 139 is applied to an IF amplifier 140 which compensates for the losses in device 139. The output of amplifier 140 is connected to a second surface-wave device 141 whose output is then applied to amplifier 142.

The output of amplifier 142 is applied to two output channels. The first output channel includes an amplifier 144 which serves to apply the raw received signal 22, FIG. 2, to an oscilloscope so that an operator may observe the raw signal. The second output channel leads by way of an envelope detector 145 to a synchronizing processor 146. Also employed is a threshold detector 147 which along with processor 146 feeds AND gate 148. The processor produces a control pulse output at a predetermined point on the waveform to enhance precision in time measurement not attained in prior systems. It avoids apparent differences in time that might arise if points along the slope of the received pulse envelope were picked on varying amplitude signals. Preferably units 146 and 147 serve to identify the peak or the center point of the received pulse for all signal levels above threshold, thereby avoiding time ambiguity that might otherwise be introduced.

FIG. 4

Figure 4:
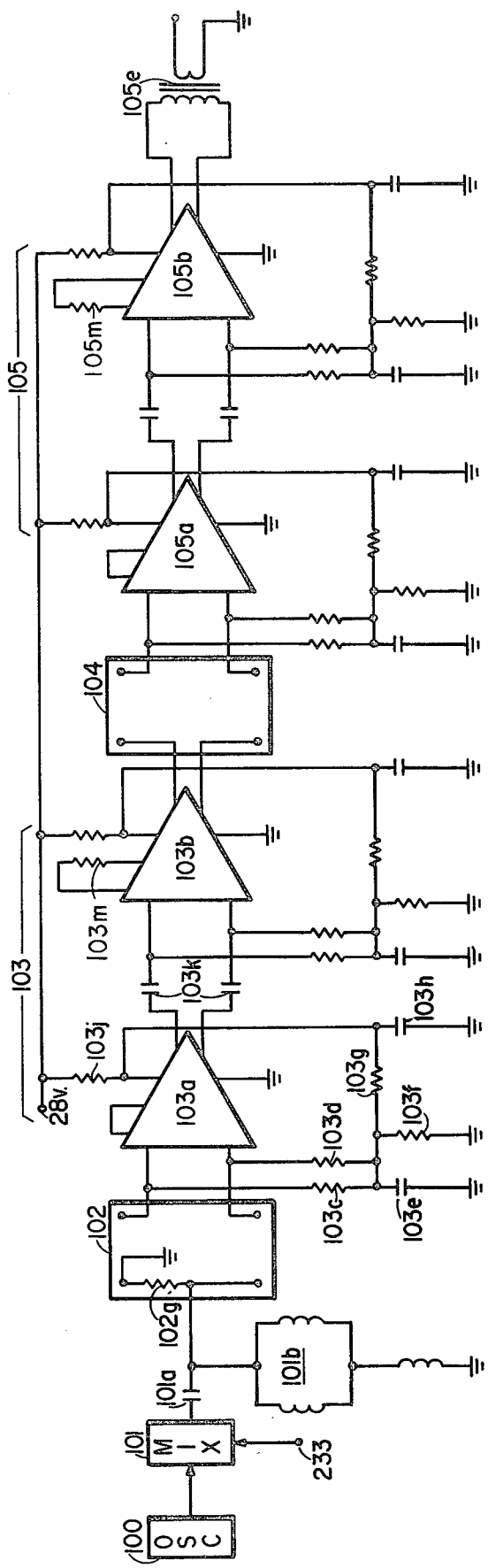
FIG. 4 is a detailed circuit diagram of the pulse expansion portions of the system of FIG. 3.

The surface-wave devices and associated circuits of the transmitter 90 of FIG. 3 have been shown in more detail in FIG. 4. Oscillator 100 is connected through mixer 101 and thence by way of capacitor 101a to the surface-wave device 102. An inductor unit 101b is connected to the juncture between capacitor 101a and device 102 and to ground.

It will be remembered that the pulse output from mixer 101 is about one-half microsecond long and comprises a 23.5 mHz signal. This signal applied to device 102 is to be stretched to a 30 microsecond frequency modulated pulse. Device 102 provides elongation of the pulse to 15 microseconds and device 104 further elongates the pulse to 30 microseconds.

The input circuit leading from capacitor 101a includes a resistor 102g which is connected to ground, thus establishing the input impedance to the device 102.

The output terminals of device 102 are connected to the input of the first stage 103a of amplifier 103. The second stage 103b is provided with the output thereof connected to the second device 104. Device 104 is connected by way of the first stage 105a of amplifier 105 followed by a second stage 105b whose output is then applied by way of coupling transformer 105e to mixer 106, FIG. 3. Units 103a, 103b, 105a and 105b may all be the same type of integrated circuit amplifiers. In the embodiment here illustrated, the circuit elements connected to amplifier 103a were as follows:

| | |
|---|---|
| resistors 103c and 103d | 510 ohms |
| capacitor 103e | 0.001 microfarads |
| resistor 103f | 12k ohms |
| resistor 103g | 12k ohms |
| capacitor 103h | 0.01 microfarads |
| resistor 103j | 1k ohms |
| capacitors 103k | 0.012 microfarads |
| capacitor 101a | 33 picofarads |
| parallel inductors 101b | 0.33 microHenrys |
| series inductor | 1.2 microHenry |

The same values are employed in the remaining stages except that in amplifiers 103b and 105b, resistors 103n and 105n are 2k ohms and 510 ohms, respectively. Units 103a, 103b, 105a and 105b were integrated circuit amplifiers type LM52733 manufactured and sold by Texas Instruments Incorporated of Dallas, Texas.

Figure 6:
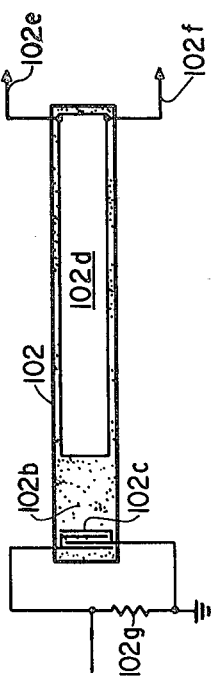
FIG. 6 illustrates a surface wave device employed for pulse expansion and frequency modulation.
Figure 5:
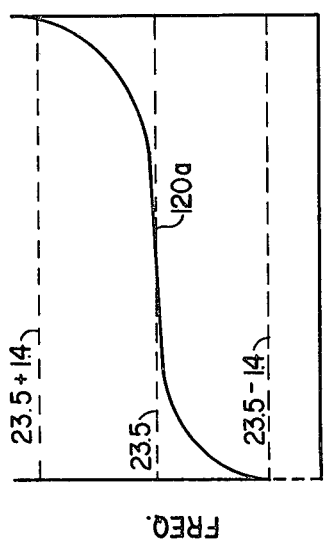
FIG. 5 illustrates frequency modulation of the pulse.

FIGS. 5 and 6

The theory of operation and construction of surface-wave devices is generally well known. In accordance with the present invention, the devices 102 and 104 are constructed so that the frequency-time characteristic is in accordance with the curve 102a of FIG. 5. The initial variation of frequency as a function of time is at a rapid rate, then is low and then at the end of the pulse, rapidly changes frequency. The resultant transmission is a chirp like pulse. In the example here described, the output pulse of 30 μ seconds length varied from a low frequency of 22.1 mHz to a high frequency of 24.9 mHz.

As shown in FIG. 6, the surface-wave device 102 is in the form of a quartz plate 102b of the order of dimensions of about 1/16 inch thickness, ⅜ inch wide, and 2½ inches long. Input electrodes in the form of interlaced fingers plated on the surface of the quartz plate, such as fingers 102c, are connected to apply the input signal to the device. An array of interlaced fingers (not shown) in the zone 102d, also plated on the surface of plate 102b, serves to produce an electrical output on lines 102e and 102f such that the output pulse will have constant amplitude but will be significantly longer than the input pulse. Device 102 produces an output pulse 15 microseconds long for 0.5 microsecond input pulse. The signal as it appears on lines 102e and 102f is also frequency modulated.

Device 104, FIG. 3, is identical to device 102. The spacing between the centers of adjacent fingers 102c is one-half wavelength of sound in quartz. Wavelength λ is expressed as $\lambda = v/f$ where $v$ is the velocity of sound in quartz and where $f$ is frequency. The velocity of sound in quartz is of the order of $10^5$ slower than the velocity of light, the velocity of light being $3 \times 10^8$ meters/sec. Thus, the spacing between the fingers 102c is determined by the frequency 23.5 mHz and the spacing between the fingers in zone 102d is inversely proportional to the frequencies set out in FIG. 5. With devices 102 and 104 built identical in their construction, the one-half microsecond 23.5 mHz pulse applied to gate 102 becomes a 30 microsecond frequency-modulated chirp having variations in frequency from 22.1 mHz at the beginning of the pulse to 24.9 mHz at the end with the rate of variation being described by the curve 102a of FIG. 5.

FIG. 7

In the receiver module of FIG. 3, the circuits from antenna 120 to IF amplifier 135 are well known. The output of the IF amplifier 135 is applied to mixer 136, the first stage in FIG. 7. Surface-wave device 139 and the preceding circuits of the receiver module 91 of FIG. 3 are shown in detail in FIG. 7. A 113.5 mHz local oscillator signal from oscillator 107, FIG. 3, is applied to terminal 200, FIG. 7. The 90 mHz IF signal from amplifier 135 is applied to terminal 201.

In FIG. 7, the two signals from terminals 200 and 201 are mixed in field effect transistor (FET) 202. The 23.5 mHz difference center frequency signal is then coupled by capacitor 203 to bandpass amplifier 137 which involves a single stage of amplification in FET 204. The output of amplifier 137 is coupled by capacitor 205 to the input of amplifier 138. Amplifier 138 is an integrated circuit limiter amplifier. The output of amplifier 138 is coupled by capacitor 206 to the surface-wave device 139 which compresses the detected signal to 15 microseconds duration.

The output of the surface-wave device 139 appears on lines 207 which lead to the input of IF amplifier 140. Amplifier 140 includes two integrated circuits 208 and 209. The output of circuit 209 is connected to the second surface-wave device 141 further to compress the signal to about 0.5 µ second.

FIG. 8

The pulse output from device 141 is applied to IF amplifier 142 which includes integrated circuit amplifier 210. Amplifier 210 provides two output signals. One output signal channel includes line 211 and resistor 212 by way of which the raw pulse is applied to an amplifier 144. The amplified output pulse appears at terminal 213 and is applied to an oscilloscope 214 which generates a time gate 215 which an operator will adjust in time so that the detected pulse will ride centrally within the gate to assist manual operation.

The second signal channel from amplifier 210 includes resistor 215 and capacitor 216 leading to the envelope detector 145. The envelope detector includes the circuits of transistors 220 and 221 and an output integrated circuit amplifier 222 to produce at output terminal 223 a pulse representative of the input signal envelope. This envelope may appear generally as shown by waveforms 18 and 22, FIG. 2. In order to extract more precise time information, the output waveforms are specially processed by the circuit of FIG. 9.

FIG. 9

FIG. 9 illustrates the synchronous processor 146 and a threshold detector 147 of FIG. 3. More particularly, the pulse appearing at terminal 223, FIG. 8, is applied to a threshold integrated circuit 224 by way of input resistor 225. The threshold level is selectable by means of the potentiometer 226. The output signal from unit 224 is then applied to an OR gate 227. The synchronous processor 146 includes a differential amplifier 228 having a first input supplied from terminal 223 by way of resistor 229. The second input of differential amplifier 228 is supplied from terminal 223 by way of resistor 230 and a two section delay line 231a and 231b. Resistor 229 serves to reduce the amplitude of the first input signal. The delay lines 231a and 231b delay the pulse by about 200 nanoseconds. By this means there will be produced on output line 233 a change of state pulse. The pulse will occur at the center of the pulse waveform applied to terminal 232. This is produced by selecting the time delay in units 231a and 231b such that the high amplitude delayed signal applied to amplifier 228 from delay line 231b will become larger than the signal applied to amplifier 228 by way of resistor 229 at the center of the output pulse. By this means the pulse appearing on line 233 will always appear at a predetermined time relative to the input pulse. This avoids the ambiguity that might be introduced if the leading edge of the output pulse were to be sensed. The leading edge of output pulses which do not have the same amplitude on each repetition thereof would cause variations in the time pick on the output pulses. Thus, the synchronous processor 146 eliminates that ambiguity and inaccuracies in range measurement with variation in signal strength. Unit 227 produces a single sharp output pulse at terminal 232.

The system thus far described in FIGS. 4–9 is provided at the mobile station 10, FIG. 1. Transponder action automatically is provided for a system shown in FIG. 1 by connecting the output line from unit 148 to the transmit command input to mixer 101.

It will now be appreciated that essentially the same system shown in FIGS. 4–9 is suitable for the mobile station 10 as well as the transponder stations 11–13. However, transponder stations 11–13 will not include the channels 211–213 leading to display unit 214 of FIG. 8.

At the mobile station 10 and at each of the transponder stations 11–13, a second thresholding network including a module 240, FIG. 9, is provided. The input to module 240 is supplied from terminal 223 by way of resistor 241. The output from the threshold unit 240 is applied by way of a pulse stretcher circuit 242 to a threshold output terminal 243. The pulse stretcher circuit 242 includes a transistor 244 connected to a differential amplifier 245 to provide an elongated output pulse which is used in connection with addressing and synchronizing base stations 11–13.

FIG. 10

Figure 10:
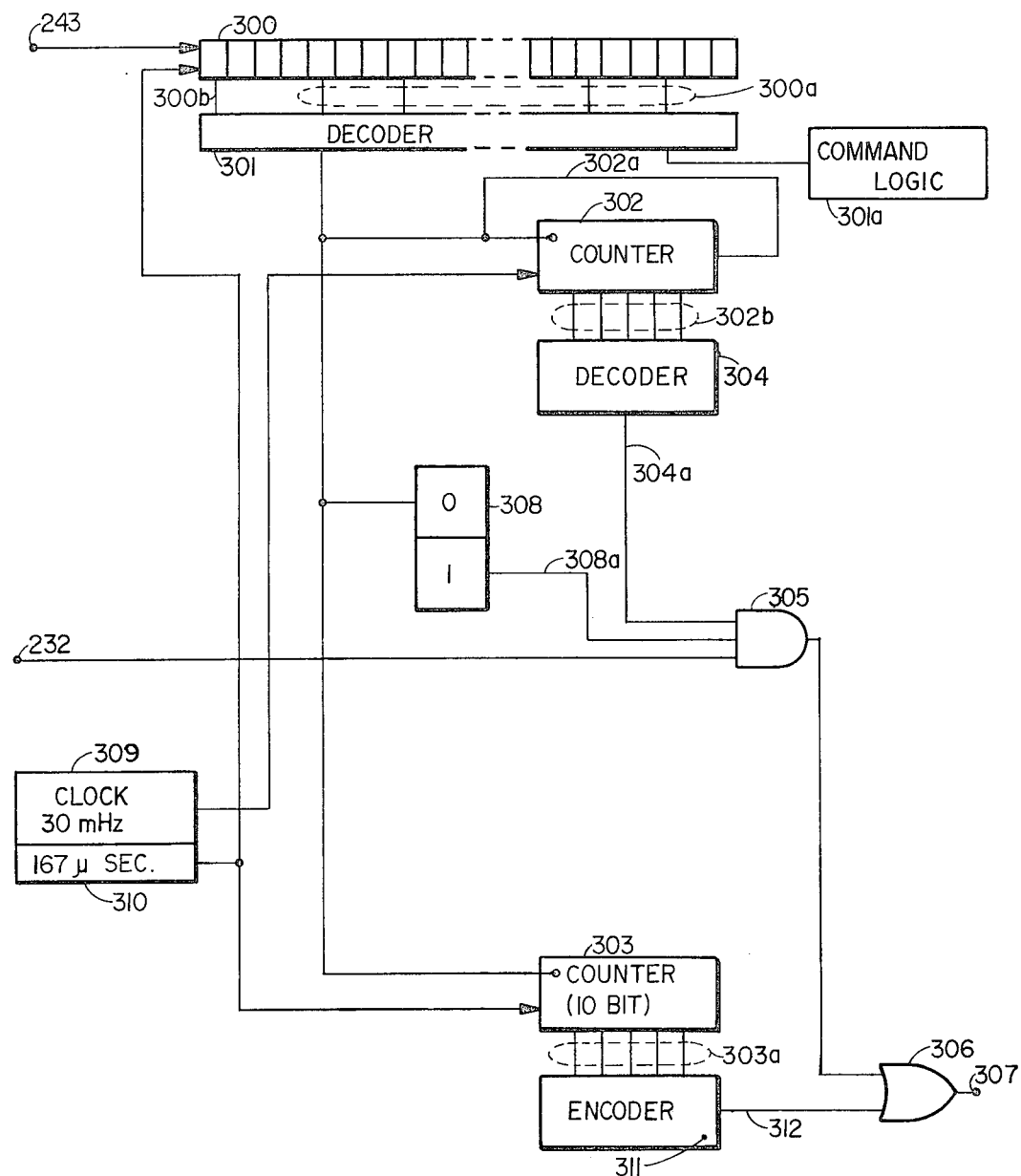
FIG. 10 illustrates the synchronizing portions of a system for a base station.

The mobile station 10 and each of base stations 11–13 includes synchronizing means for initiating controlling operation thereof. One form of the circuits to be employed at each of the base stations 11–13 is shown in FIG. 10.

Each base station includes a shift register 300. Register 300 is one bit wide and 56 bits long. A decoder 301 is connected to selected bits of shift register 300. Decoder 301 is connected to reset terminals of counters 302 and 303. Counter 302 is connected to a decoder 304 which in turn is connected through AND gate 305 and an OR gate 306 to output terminal 307. Terminal 307 is to be connected to the transmit command input of the gate 101, FIG. 3, and terminal 232, FIG. 9, is to be connected to AND gate 305.

The second counter 303 is connected to an encoder 311 whose output is connected by way of line 312 and OR gate 306 to output terminal 307.

The decoder 301 is also connected to a state control unit shown in the form of a monostable multivibrator 308. The output of multivibrator 308 is connected to AND gate 305. Unit 308 may have a period of about 10 milliseconds.

A clock pulse generator 309 is connected from a section 310 thereof which has output pulses spaced 167 microseconds appart to the clock input terminals of shift register 300 and counter 303. Clock section 310 causes shift register 300 to operate at the 167 microsecond pulse rate to shift received pulses appearing at teminal 243 through register 300. Decoder 301 will produce an output pulse only when the contents of the shift register 300, i.e., the true states therein, correspond and are momentarily located where lines 300a leading to decoder 301 are connected. When decoder 301 produces an output pulse indicating the receipt of a particular sequence of pulses from terminal 243, the counter 302 is reset. Counter 302 is also reset automatically. Counter 302 is a 10 millisecond counter with a reset line 302a causing the counter automatically to reset itself every 10 milliseconds. Decoder 304 is connected by way of channels 302b to counter 302. The output signal on line 304a which leads to AND gate 305 is a time gate during which the system looks for and may be responsive to ranging pulses applied by way of terminal 232.

The presence of a true state on line 308a enables AND gate 305. False states on line 308a are produced by any output pulse from decoder 301 to prevent the channel which includes gate 305 from ordering transmission of a return pulse from the base station during the sync operation.

For sync operations, decoder 301 is connected to the reset terminal of counter 303 which is operated at the 167 microsecond pulse rate. Counter 303 is connected by way of lines 303a to an encoder 311 so that each time an address or sync code appears at terminal 243, decoder 301 applies a reset signal to counter 303. This causes counter 303 to run to generate through encoder 311 a series of pulses on line 312 which cause a corresponding pulse position code in the form of a series of RF pulses to be transmitted from the base station.

It will be understood that each base station includes a synchronizing and control system such as shown in FIG. 10 and a transmitter and receiver system such as shown in FIG. 3. Decoder 301 also may be employed to decode a plurality of commands, as many as thirty-two in number, for remote control of antenna positions and other functions of the base station through command logic which may be provided in unit 301a. This may eliminate the need continuously to man the base station.

FIG. 11

Figure 11:
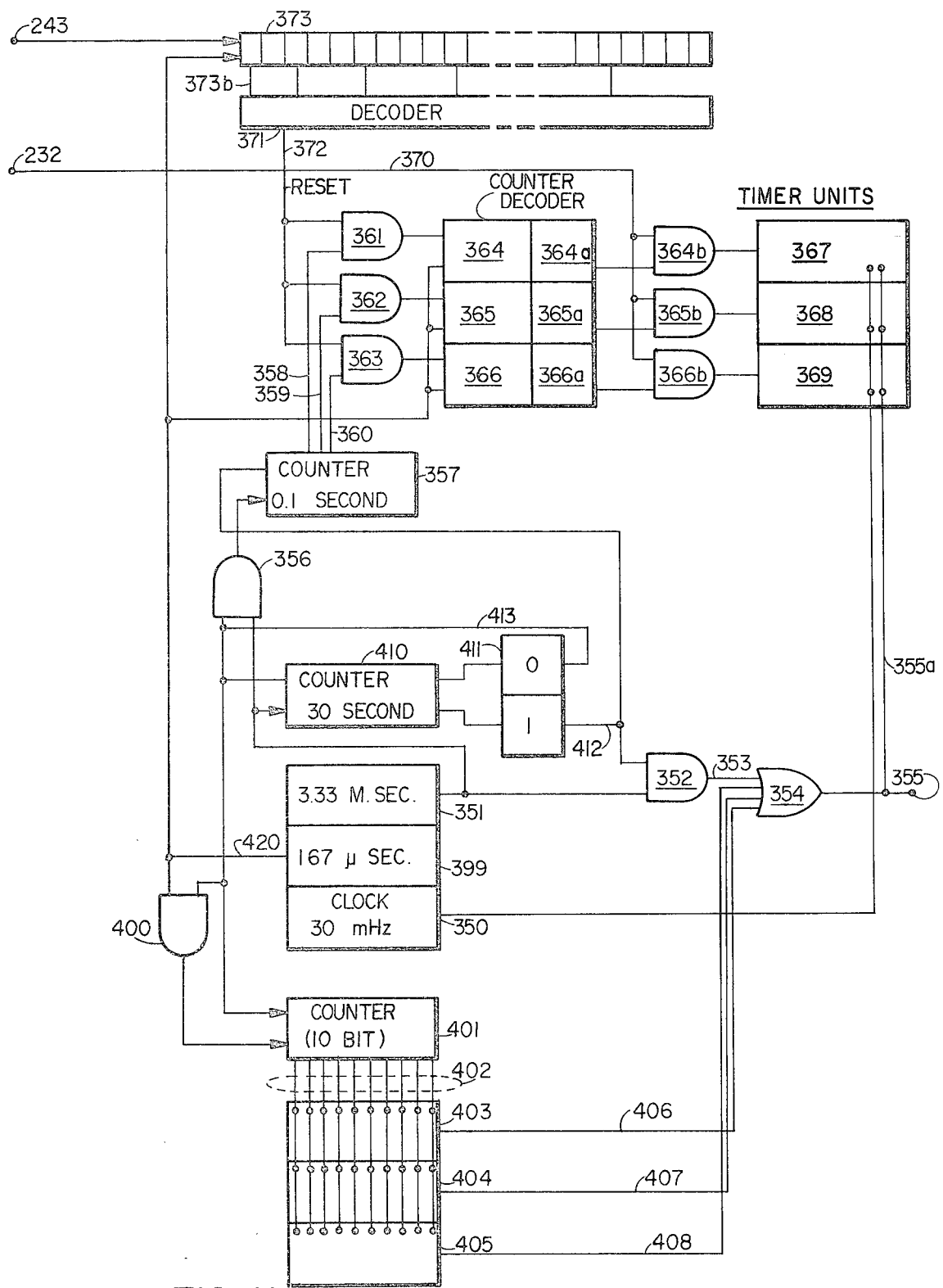
FIG. 11 illustrates the synchronizing portions of a system for a mobile station.

FIG. 11 illustrates a form of sync circuit to be employed at mobile station 10 in conjunction with a transmitter-receiver unit such as shown in FIG. 3.

A clock 350 operates at 30 megaHertz. Section 351 of clock 350 has an output at 3.33 millisecond intervals. Section 351 is connected by way of AND gate 352 to produce output pulses on line 353 every 3.3 milliseconds only when AND gate 352 is enabled. Line 353 is connected by way of OR gate 354 to an output terminal 355. Output terminal 355 is to be connected to the transmit command terminal of gate 101, FIG. 3. Section 351 is also connected by way of AN gate 356 to the input of a scale-of-3 counter 357. Line 413 leading from flip-flop 411 is connected to one input of gate 356 and gate 400 and reset input of counter 401. Counter 357 counts from zero to 0.10 second with 3.3 millisecond pulses on the input thereof. Counter 357 has three output lines 358, 359 and 360 which lead by way of AND gates 361, 362 and 363, respectively, to counters 364, 365 and 366, respectively. Lines 358-360 are sequentially true for 33.33 milliseconds during each sync cycle. Output from counters 364-366 are time gates produced by decode sections 364a-366a, and applied to AND gates 364b-366b sequentially and cyclically to enable gates 364b-366b to pass to range measuring timer units 367, 368 and 369 pulses from terminal 232. Gates 361-363 are enabled at times dependent upon the receipt of reset pulses on line 372. Timer units 367-369 begin a range count of pulses from clock 350 upon occurrence of transmitted pulses at terminal 355. Terminal 355 is connected to units 367-369 by line 355a. Units 367-369 preferably will include a cathode ray display of the range measurements.

Following each sync cycle, counters 364-366 run through 10 millisecond cycles each beginning at a time determined by the reset pulse on line 372 and will continue to so run until reset again during the next succeeding sync cycle. Ranging pulse terminal 232, FIG. 9, is connected by way of line 370 to the input AND gates leading to each of the display units 367-369.

AND gates 361-363 are connected to the output of a decoder 371 by way of line 372. Decoder 371 receives its input signals from a shift register 373 which is similar to register 300 of FIG. 10. The sync pulse output terminal 243, FIG. 9, is connected to the input of shift register 373.

Clock section 399 operates to produce pulses every 167 $\mu$-seconds. Section 399 is connected by way of line 420 and AND gate 400 to a ten bit counter 401. Counter 401 is connected by way of lines 402 to encoders 403, 404 and 405. Three different pulse position codes are produced in sequence by encoders 403-405 during each sync cycle. The sync codes appear on lines 406, 407 and 408, respectively. Encoders 403-405 are matched to different decoders in base stations 11-13. Lines 406-408 are connected by way of OR gate 354 to output terminal 355.

The clock section 351 operates at a 3.33 millisecond pulse rate. Section 351 is connected to a ring counter 410. Two outputs of ring counter 410 are connected to a flip-flop 411. Line 412 from flip-flop 411 is connected to a second input of AND gate 352 and to the reset terminal of counter 357. Line 413 of flip-flop 411 is connected to the reset terminal of counter 410, to the second input of AND gate 356 and to the second input of AND gate 400. Line 413 is also connected to the reset terminal of counter 401.

Counter 410 is so set to actuate flip-flop 411 when counter 410 is reset. When counter 401 is reset, the sync cycle is initiated. Counter 410 actuates flip-flop 411 at the end of 0.10 second after reset of counter 410. During the 0.10 second interval, the three sync codes appear sequentially on lines 406-408. At the end of the 0.10 second sync interval, line 412 becomes true, gate 352 is enabled and the system operates in a ranging mode for the next 29.9 seconds. In this mode, the pulses appearing at the 3.33 millisecond rate from clock section 351 cause the transmitter at the mobile station to transmit ranging pulses at that rate. During ranging a gate pulse is applied every 10 milliseconds to AND gate 364b. A gate is applied to AND gate 365b every 10 milliseconds but delayed 3.3 milliseconds from the gate pulse to AND gate 364b. A gate pulse is applied to AND gate 366b every 10 milliseconds but delayed 3.3 milliseconds from the pulse to AND gate 365b.

The shift register 300-decoder 301 combination at each base station will be matched by the selective connections 300a to one of the encoders 403-405, FIG. 11. Under control of counter 410 each base station operates either in a synchronizing mode or a ranging mode. The mobile station operates in the synchronizing mode for a period of about one-tenth second. Each base station is in the sync mode for about ⅓ second. The ranging mode following each synchronizing mode extends for about 29 seconds. The synchronizing-ranging sequence is repeated every 30 seconds. Counter 410 determines the mode through flip-flop 411. when flip-flop 411 is in such state that line 413 is true, gate 400 is enabled, gate 352 is disabled, and the system operates in a sync mode. As counter 401 counts at a 167 microsecond pulse rate, the codes applied to encoders 403-405 cause a pulse position code first to appear on line 406 to address one of the three base stations, such as station 11. Thereafter, a different pulse position code appears on line 407 which addresses station 12. Finally, a pulse position code appears on line 408 which addresses station 13. The shift register 300-decoder 301, FIG. 10, at station 11 is tailored to respond to the pulse position code on line 406. The shift register 300-decoder 301 at station 12 is tailored to respond to the code on line 407. The shift register 300-decoder 301 at station 13 is tailored to respond to the code on line 408.

In the previous description of FIG. 9, reference was made to pulse stretcher 242. It will be recalled that the output of the threshold unit 240 is a sharp pulse appearing in time coincidence with a pulse, such as pulse 19 or pulse 24 of FIG. 2. In the pulse stretcher 242 of FIG. 9, the sharp microsecond length pulse is stretched to be of the order of about 167 microseconds. This assures that when a train of position coded pulses appears at terminal 243, FIG. 10, no bit location in the shift register 300 intended to be in a true state will be missed. The same applies to the shift register 373 of FIG. 11.

Further, it will be noted in FIG. 10 that the last bit of the shift register 300 is connected by way of line 300b to decoder 301. In register 373, FIG. 11, the last bit is connected by way of line 373b to decoder 371. This assures, at each base station, initiation of operation of counter 302 at a predetermined time in relation to the ranging-transmission sequence from mobile station 10. The output of counter 302 as decoded by unit 304 will produce a gate on line 304a every 10 milliseconds following receipt of the synchronizing pulse from decoder 301. The gate on line 304a is chosen so that the received pulse from the mobile station will fall within that gate and thus cause a return pulse to be transmitted from the base station. Because the mobile station is moving relative to the base stations, the periodic resynchronization, i.e., every 30 seconds, automatically accommodates movement of the mobile station relative to the base stations by resetting counter 302 to an independent time sequence each time the system operates in the sync mode.

FIG. 12

Figure 12:
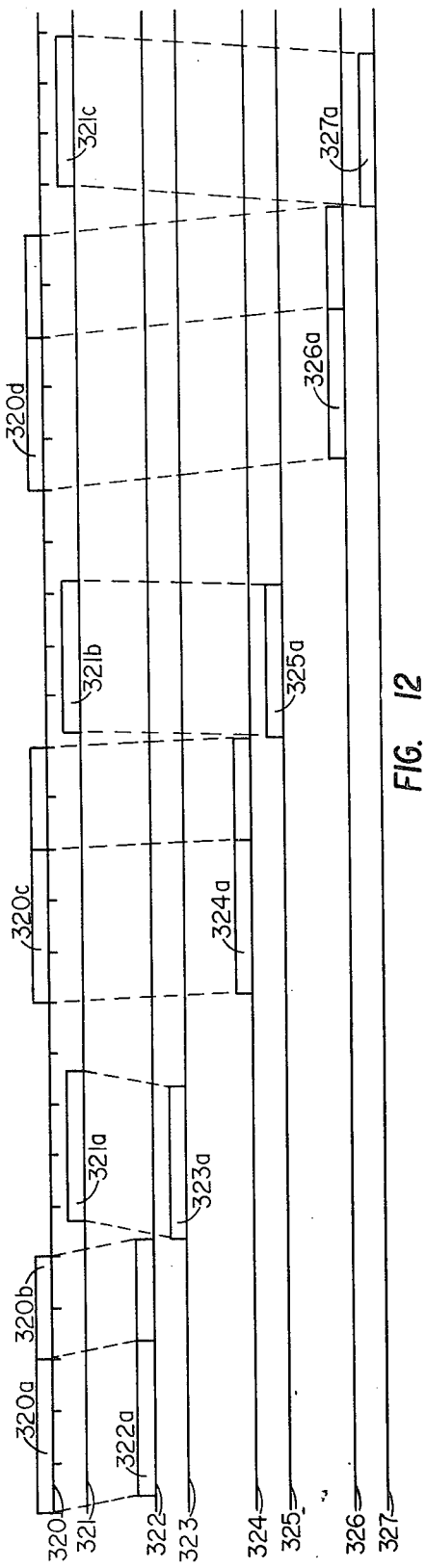
FIG. 12 illustrates the sequence of synchronizing pulse codes.

In FIG. 12, transmission and reception from the mobile station 10 and base stations 11–13 are illustrated. Line 320 represents transmission during synchronization from the mobile station and is marked off in segments representing 3.33 milliseconds each. Line 321 portrays receptions of signals transmitted from the base station to the mobile station. Line 322 represents receptions by the base station 11. Line 323 represents transmissions by the transmitter at base station 11. Lines 324 and 325 represent receptions and transmissions from base station 12 and lines 326 and 327 represent receptions and transmission, respectively, by base station 13.

In the synchronous mode a first RF transmission from mobile station 10 comprises a first unique pulse position address code transmitted during time interval 320a. Any desired operational command to be utilized at the base station 11 may be transmitted during time interval 320b. Transmitted signals are then received and decoded during interval 322a by station 11. During interval 323a, station 11 transmits a pulse position code back to the mobile station 10 which is received during interval 321a.

During interval 320c a second unique pulse position code is transmitted which is received during interval 324a by station 12. During interval 325a, station 12 transmits back to mobile station 10 a pulse position code identical to the code transmitted back froom station 11. This return code is then received during interval 321b. Base station 13 is then contacted by transmitting a third unique pulse position code during interval 320d which is received by station 13 during interval 326a. The same return code is then transmitted by station 13 during interval 327a. This code is then received by mobile station during interval 321c.

When each of base stations 11–13 reply, synchronization is then known to be established. A series of ranging pulses is then transmitted from boat 10.

FIG. 13

Figure 13:
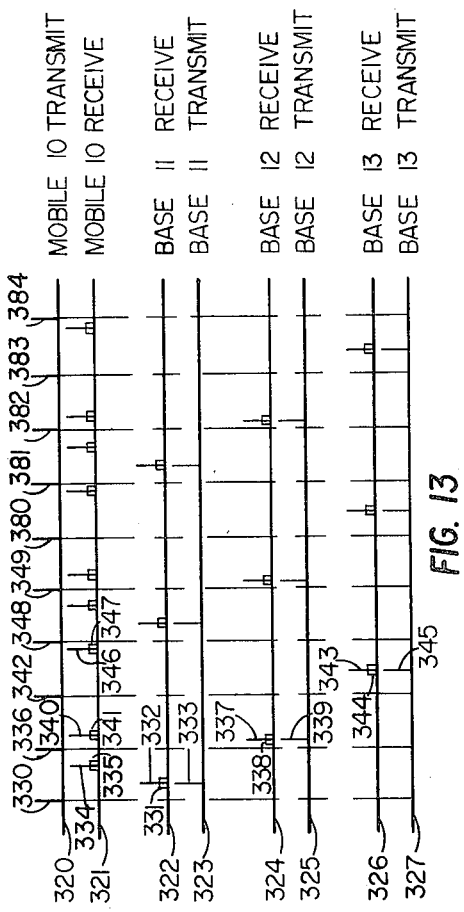
FIG. 13 illustrates the sequence of ranging operations.

The ranging pulses and returns are illustrated in FIG. 13. They are transmitted at uniform time intervals of 3.33 milliseconds as indicated on line 320. As above noted, base station 11 has time gates 364a–366a. A gate pulse 331 is applied to AND gate 364b, FIG. 11. The pulse 332 received at base station 11 would appear at terminal 232, FIG. 10, will appear during gate 331 and is transmitted through gate 306, FIG. 10, to initiate a return pulse 333, FIG. 13, from base station 11. At the mobile station 10, return pulse 334 is detected during gate 335. Pule 334 is received and utilized for determination and/or display of range information.

The next pulse 336 from mobile station 10 is received as pulse 337 during gate 338 by station 12. In response to reception of pulse 337, a transmitted pulse 339 is generated by station 12. The resulting pulse 340 is received during gate 341 at mobile station 10.

The next ranging pulse 342 is transmitted from boat 10. The received pulse 343 at base station 13 during gate 344 is utilized to generate transmitted pulse 345. The return pulse 346, produced at boat 10 during gate 347, is then employed for ranging purposes.

The foregoing sequence is then repeated for pulses 348, 340, 380 . . . 384, etc.

The ranging sequence may thus be summarized as follows. Periodically mobile station 10 transmits a short time sequence of pulse position sync codes including one code uniquely tailored for receipt only by each one of a plurality of base stations. In the interval between sync code sequences, mobile station 10 transmits a long train of uniformly time spaced range interrogation pulses. Upon receipt by each of base stations 11–13 of that sync code which is tailored thereto, a sync reply code is transponded. The sync reply code is the same reply code format for all base stations but has a time delay dependent upon range from mobile station 10. A train of receive time gates is generated at the mobile station. One train is generated for each base station in reponse to receipt of sync reply code from each base station with the time gates having a rate dependent upon the rate of the range interrogation pulses and of phase determined by the arrival time of a sync reply code from the given base station. The base stations transpond range reply pulses in response to receipt of successive range interrogation pulses. For each base station, the mobile station measures the time interval between transmission of a given range interrogation pulse and reception of the transponded range reply pulse at the mobile station within the receive time gate for each base station.

Responses to range reply pulses are limited to range reply pulses falling within the time gates. The phases of the time gate automatically are adjusted for change in range due to motion of the mobile station by the periodic repetition of the sync code sequence.

It will be appreciated that the clock rates and timing provisions in the example of the system presented above described are not necessary limitations. Different clock rates, different pulse repetition rates and different sync codes may be employed.

Further, by way of example, the modules of FIGS. 3, 4, 7-9 are identified as follows and are given as exemplary of system components that are suitable:

FIG. 3:
amplifier 116 is based upon EIMAC tube No. 4CPX25OK and amplifier 117 is based upon EIMAC tube No. X-213SG.

| FIG. 4: | |
|---|---|
| amplifiers 103a, 103b, 105a and 105b | Texas Instruments Inc. SN52733 |
| FIGS. 7-9: | |
| FET 202, 204 | RCA No. 40673 |
| amplifier 138 | RCA No. CA3076 |
| amplifiers 208, 209, 210 | Texas Instruments Inc. No. SN52733 |
| amplifier 222 | National Semiconductor No. LH0033 |
| transistors 220, 221 | Texas Instruments Inc. No. 2N4252 |
| amplifiers 224, 228, 240 | Texas Instruments Inc. No. SN52710 |
| delay lines 231, 232 | Rhombus Industries No. TYB 66-10 |

Having described the invention in connection with certain specific embodiments thereof, it is to be understood that further modifications may now suggest themselves to those skilled in the art and it is intended to cover such modifications as fall within the scope of the appended claims.

What is claimed is:

1. A radio ranging system comprising:
   a. means periodically to transmit from a mobile station a short time sequence of pulse position sync codes including one code uniquely tailored for receipt only by each one of a plurality of base stations,
   b. means operative in the interval between sync code sequences for transmitting a long train of uniformly time spaced range interrogation pulses,
   c. transponder means to transmit a sync reply code upon receipt by each base station of the sync code tailored thereto where said reply code is the same as from all base stations but time delayed dependent upon range from said mobile station,
   d. means to generate a train of receive time gates, one for each base station in response to receipt of a sync reply code from each base station with the time gates synchronized with said range interrogation pulses and of phase determined by the arrival time of a sync reply code from each base station,
   e. transponder means to transmit from each base station a range reply pulse in response to receipt of said range interrogation pulses, and
   f. measuring means at said mobile station for measuring the time interval between transmission of range interrogation pulses and reception of range reply pulses detected at said mobile station within a receive time gate for each said base station,
   whereby reponses to range reply pulses are limited to pulses falling within said gates the phases of which automatically are adjusted for change in range due to motion of said mobile station by the periodic repetition of said sync code sequence.

2. The system of claim 1 further comprising control means for transmitting said sync pulse code sequences at about one minute intervals repeatedly to readjust said phase in dependence upon change in position of said mobile stations.

3. The system of claim 1 wherein means at said mobile station generating said sync codes includes two surface wave devices to produce spread spectrum pulses for said code and wherein matched surface wave devices at said base stations compress said pulses to facilitate sensing said codes.

4. A system to establish the radio range of a mobile station relative to a pair of base stations comprising:
   a. means periodically to transmit a sequence of two different sync pulse codes from said mobile station,
   b. decoder means to decode said sync codes at a first of said base stations and transpond a reply pulse code,
   c. decoder to decode the other of said sync codes at the second of said base stations and transpond with said reply pulse code,
   d. means to transmit range interrogation pulses from said mobile stations at a predetermined rate in the intervals between said sync pulse code sequences,
   e. means at said mobile station to establish range gates synchronized to said range interrogation pulses for each said base station but adjusted in phase by receipt at said mobile station of a reply pulse code,
   f. means at said base stations to receive said range interrogation pulses and to respond by transmission of range reply pulses, and
   g. means at said mobile station to measure the time intervals between transmission of range interrogation pulses and receipt within said range gates of range reply pulses from said base stations.

5. In radio ranging, the method comprising:
   a. transmitting from a mobile station a train of uniformly spaced range interrogation pulses,
   b. transponding range reply pulses from each of a plurality of base stations which receive said range interrogation pulses,
   c. for each base station initiating at said mobile station a time measurement upon transmission of said range interrogation pulses,
   d. for each said time measurement, establishing a train of receive time gates synchronized with said interrogation pulses, said receive time gates for any given base station occuring at times different than the receive time gates for any other base station, and
   e. periodically automatically adjusting the phase of said time gates in dependence upon the range from said mobile station to each said base station to position one of said gates in time coincidence with range reply pulses from respective ones of said base stations while said mobile station moves to alter range to the respective base stations.

6. In radio ranging from a mobile station and a pair of base stations, the method of:

a. transmitting from said mobile station in sequence two pulse position codes, one for each said base station,
b. transmitting from said base stations identical reply pulse position codes in response to receipt of one of said unique codes,
c. in response to receipt of said reply codes initiating two trains of listening intervals each dependent in phase upon the time of receipt of a reply pulse position code from a base station,
d. transmitting a train of uniformly time spaced range interrogation pulses after receipt of said reply pulse position codes from both said base stations,
e. transponding range reply pulses from said base stations in response to receipt of successive range interrogation pulses, and
f. measuring ranging time intervals in dependence upon range reply pulses received only in said intervals.

7. The method of claim 6 wherein at each base station, in response to receipt of each said unique code, a sequence of enable conditions is initiated to permit each said base station exclusively to respond to selected members of said train of range pulses.

8. The method of claim 7 wherein a time sequence is initiated for controlling base station response enable conditions in response to receipt of each unique code received by a base station.

9. In navigation of a mobile station in the range of a pair of base stations, the method which comprises:
    a. sequentially transmitting from said mobile station pulse position sync codes, one unique to each said base station,
    b. sensing at each base station the sync code unique thereto,
    c. establishing a train of listening intervals at each base station in response to reception of its sync code while transmitting from each base station a common reply pulse position code,
    d. sensing said reply codes at said mobile station,
    e. in response to said reply codes transmitting a train of uniformly time spaced ranging pulses at a rate a multiple of the rate of said listening intervals,
    f. transponding a range reply pulse from said base stations upon receipt of response to successive range interrogation pulses in said train, and
    g. measuring the time interval between each range interrogation pulse and a range reply pulse from only one of said base stations.

10. In synchronization of operations for a mobile station operating in the range of a set of base stations, the combination which comprises:
    a. means at said mobile station to transmit successive RF pulse position code sets, one uniquely related to each of said base stations and each set having a key pulse in the same position in all said sets,
    b. means to generate trains of time gates each bearing a known phase relation to a key pulse in one of said sets,
    c. means at said base stations to transmit back to said mobile station a reply pulse position code in response to receipt of one of said unique sets,
    d. means at said mobile station to generate a train of interrogation pulses in which pulses are synchronized with said time gates and in a known relation to a key pulse in said reply code,
    e. means at said mobile station responsive to the common reply pulse position code from the last of said base stations to initiate periodic transmission of range interrogation pulses from said mobile station, and
    f. counter means at said mobile station to enable said mobile station to sense range reply pulses sequentially to respond to only one range reply pulse from a base station for each ranging pulse transmitted from said mobile station.

11. The combination set forth in claim 10 further comprising counter means at each base station for enabling said base station to respond only to range pulses received in predetermined phase relation to receipt of the unique code for said station.

12. A system to assist navigation of a mobile station in the range of a pair of base stations which comprises:
    a. means at said mobile station to transmit successive unique RF pulse position code sets with a key pulse in each said set bearing a predetermined time relation to a timing series at said mobile station,
    b. means at a first of said base stations to transmit back to said mobile station a common reply pulse position code in response to one of said sets,
    c. means at said mobile station to initiate a timing pulse train in which the pulses are synchronized with said time series but bearing a predetermined relation to said key pulse in the code set received from said first station,
    d. means at a second of said base stations to transmit back to said mobile station a common reply pulse position code in response to a second of said sets,
    e. means at said mobile station to initiate a second timing pulse train in which the pulses are synchronized with said time series but bearing a predetermined relation to said key pulse in said second code set,
    f. means at said mobile station responsive to said timing pulse trains to establish a plurality of series of listening intervals, one for each base station, each of which have a predetermined time relation to the receipt at said mobile station of the key pulse in the common reply pulse position code from said first and second base stations, respectively, and
    g. means to measure the interval between transmission of a ranging pulse from said mobile station and receipt of the reply pulse from any base station during one of said listening intervals.

* * * * *